United States Patent
Patten et al.

(10) Patent No.: US 9,886,430 B2
(45) Date of Patent: Feb. 6, 2018

(54) ENTITY BASED CONTENT SELECTION

(71) Applicant: Microsoft Technology Licensing, LLC, Redmond, WA (US)

(72) Inventors: Michael J. Patten, Sammamish, WA (US); Joon Chang, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 241 days.

(21) Appl. No.: 14/553,904

(22) Filed: Nov. 25, 2014

(65) Prior Publication Data

US 2016/0147725 A1    May 26, 2016

(51) Int. Cl.
  *G06F 17/00*  (2006.01)
  *G06F 17/24*  (2006.01)
  *G06F 17/27*  (2006.01)
  *G06F 17/30*  (2006.01)

(52) U.S. Cl.
  CPC .......... *G06F 17/241* (2013.01); *G06F 17/278* (2013.01); *G06F 17/30899* (2013.01)

(58) Field of Classification Search
  CPC ................................................ G06F 17/2247
  See application file for complete search history.

(56) References Cited

U.S. PATENT DOCUMENTS

| | | | |
|---|---|---|---|
| 7,840,033 | B2 | 11/2010 | Kurzweil et al. |
| 8,593,666 | B2 | 11/2013 | Xiao |
| 8,825,671 | B1 | 9/2014 | Nordstrom |
| 2004/0133595 | A1 * | 7/2004 | Black ....................... G06F 17/24 |
| 2007/0146812 | A1 * | 6/2007 | Lawton .................. G06Q 30/02 358/452 |
| 2011/0029547 | A1 * | 2/2011 | Jeong .................... G06F 3/0482 707/758 |
| 2012/0254745 | A1 | 10/2012 | SanGiovanni et al. |
| 2012/0303636 | A1 | 11/2012 | Luo et al. |
| 2013/0124953 | A1 | 5/2013 | Fan et al. |
| 2013/0275889 | A1 | 10/2013 | O'Brien-Strain et al. |
| 2014/0173482 | A1 | 6/2014 | Hicks et al. |

OTHER PUBLICATIONS

"BlackBerry Z30 Smartphone", Published on: Sep. 13, 2013, Available at: http://docs.blackberry.com/en/smartphone_users/deliverables/57031/BlackBerry_Z30_Smartphone-User_Guide-1337191904827-10.2-en.pdf, 268 pages.

* cited by examiner

*Primary Examiner* — Keith Bloomquist

(74) *Attorney, Agent, or Firm* — Fiala & Weaver P.L.L.C.

(57) ABSTRACT

Methods, systems, apparatuses, and computer program products are provided for selecting content on a displayed page. A selection mode may be initiated with regard to a displayed document that includes content. The initiation of the selection mode may be detected. Multiple entities in the displayed document are determined, with each entity including a portion of the content of the document. The displayed document is annotated to indicate the determined entities. Content selected by a user in the displayed document may be detected. At least one entity is determined to be associated with the selected content. The determined associated entity/entities are indicated in the displayed document as active entities. The user is enabled to refine the set of active entities. An action is enabled to be performed on the active entities.

20 Claims, 8 Drawing Sheets

ENTITY BASED CONTENT SELECTION

BACKGROUND

Text selection on modern touch devices, such as phones and tablets, can be difficult and tedious to complete. Often, the user knows what text they want to select on a displayed page, but need to spend time carefully refining their selection. For example, in one type of selection, a user taps a word to select the word. Once the word is selected, on-screen tools are displayed that allow the user to refine the selection. This is typically done by dragging slides that appear next to the text to add or subtract text to the selection. Once the selection is complete, the user can perform actions on the selected text.

If the user wants to select multiples areas of displayed text that are not contiguous, the user has to break up the selection into multiple separate selection tasks. For example, if a user wants to share a paragraph and a photo on a news article, unless the photo is embedded in the paragraph, it is not possible to select both the photo and the paragraph together.

A user may want to select more than a single word of displayed text, such as a few paragraphs of content. Because of the way that web pages are constructed, with advertisements frequently interspersed with the actual content of interest of a web page, this can be difficult to achieve. For example, many web pages with multiple paragraphs of content will imbed multiple ads and unrelated links on the web pages, making it difficult to select much text on the page without also selecting one or more ads.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for selecting content on a displayed page. The content is segmented into multiple entities, and more than one entity may be selected at a time to have an action performed on the selection. For example, a selection mode may be initiated with regard to a displayed document that includes content. The initiation of the selection mode may be detected. Multiple entities in the displayed document are determined, with each entity including a portion of the content of the document. The displayed document is annotated to indicate the determined entities. Content selected by a user in the displayed document may be detected. At least one entity is determined to be associated with the selected content. The selected content and the determined associated entity/entities are indicated in the displayed document as active entities. An action is enabled to be performed on the active entities.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
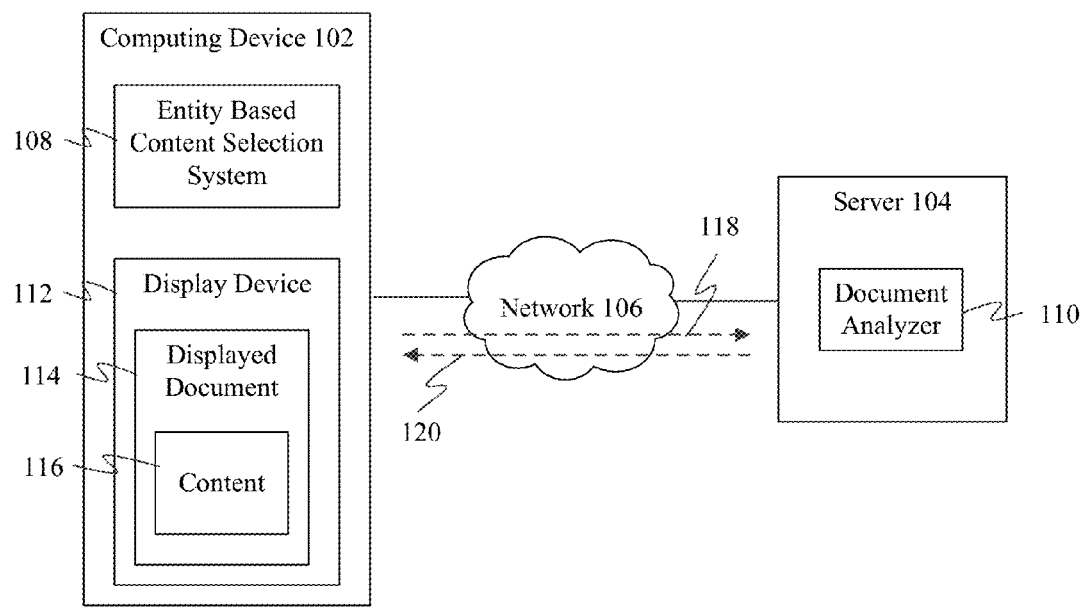
FIG. 1 shows a block diagram of communication system in which a computing device includes an entity based content selection system, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for Entity Based Content Selection

Text selection on modern touch devices, such as phones and tablets, can be difficult and tedious to complete. Often, the user knows what text they want to select on a displayed page, but need to spend time carefully refining their selection. For example, in one type of selection, a user taps a word to select the word. Once the word is selected, on-screen tools are displayed that allow the user to refine the selection. This is typically done by dragging slides that appear next to the text to add or subtract text to the selection. Once the selection is complete, the user can perform actions on the selected text.

If the user wants to select multiples areas of displayed text that are not contiguous, the user has to break up the selection into multiple separate selection tasks. Furthermore, it is usually not the case that a user wants to select a single displayed word. Instead, users typically want to select some detailed information on the page, such as a few paragraphs of content. Because of the way that web pages are constructed, with advertisements frequently interspersed with the actual content of interest of a web page, this can be difficult to achieve.

According to embodiments, the selection of content of a displayed page is performed based on entities. A user may select a portion of the content of a displayed page, such as one or more words, an image, a video, etc. The page is automatically segmented into entities, with each entity including a portion of the content of the page (e.g., a section of text, an image, a video, etc.). Based on the selected portion of content, one of the entities may be automatically selected to be selected content into addition to the portion of the content selected by the user.

In this manner, the automatic selection of additional content in a displayed document (e.g., a page, such as a web page) may be performed based on the initial selection of content by the user. The user may select one or a couple of words of the page, and one or more paragraphs, images, and/or other additional portions of the content of the displayed page may be automatically selected. Furthermore, content of the displayed page (e.g., an entire paragraph or the entire article) may be automatically selected without all of the annoying ads also be selected, and without the user having to navigate upward or downward through the displayed document to collect additional content.

In an embodiment, multiple parts of an article may be automatically selected by simply tapping or otherwise interacting with one or more words, a paragraph, a photo, etc. Furthermore, the multiple parts do not have to be contiguous, and may even be separated by ads, without selecting the ads.

In an embodiment, a user may tap or otherwise select any text in a displayed web page, and an entity that includes what was selected is automatically selected. Furthermore, a most relevant part of the text and/or other content of the displayed page may automatically be selected. An action can be performed on the selected content, such as adding the selected text to an electronic clipboard, to a Microsoft® OneNote® document, to another type of document or spreadsheet, to an email or other message, to a print queue for printing, etc.

Embodiments overcome the limitations of conventional text selection, which can be tedious, especially on small form factor devices. What text to select may be determined intelligently based on the entity of the selected text and the structure of the DOM (document object model) element, eliminating the need for granular text selection on a page. A user can tap (or otherwise select) what they want to select, and meaningful content to additionally select is automatically determined.

For instance, in one example, a user may tap on a displayed word in a document such as a web page. The web page may be automatically cleaned to remove unnecessary ads and unrelated content from being selectable on the page. Content around the current selection may be analyzed. The header immediate processing the current selection may be examined. Using a service, such as a cloud based service, an entity may be assigned around the current selection using information based on the analysis of the content and header. The selection of content is adjusted based on the type of entity detected. For instance, when a portion of content is selected by a user, a complete name and address may be automatically selected, a complete phone number may be automatically selected, a complete paragraph may be automatically selected, a complete article may be automatically selected, etc. Selected content may be determined to be a portion of a recipe, and therefore the entire recipe may be automatically selected. Selected content may be determined to be a part of an address, and the entire address may be automatically selected. Selected content may be determined to be a one or a few words in a news article, and the entire paragraph of the article may be automatically selected.

In embodiments, after automatic selection of content related to a user's selection is performed, the user may be enabled to continue to select further elements on the page and select addition content. In an embodiment, information about previous selections may be leveraged to anticipate the next selection and to make it easier to expand the selection. For example, if a user "taps" or otherwise selects a displayed word in a paragraph, it may be automatically determined that the user is interested in the entire paragraph, not just the word. Therefore, the entire paragraph may be automatically selected. In an embodiment, on on-screen affordance (e.g., a "control") may be displayed that makes it convenient for the user to select the entire article. Using this approach, the user can select the entire article in a relatively small number of taps, including just one or two taps.

For instance, in another example, a user may tap (in a touch embodiment) on a photo displayed on a web page. This may cause an initiation of a selection mode the implements an embodiment of entity based content selection. The page may be automatically segmented into a plurality of entities, such as the (first) photo, a paragraph, a second photo, etc. The user may select the first photo. The user may select the paragraph. The user may scroll down the page. The user may select the second photo. The user may then perform an action on all of the selected content items.

In an embodiment, when an article spans multiple pages, entities on all of the pages may be determined, and one or more of the entities may be automatically selected based on a user selection of some content of the article. If the user chooses to select the entire article, all parts of the article on all of the pages may be selected. As such, the user does not need to select content from a first page of an article, copy/paste the selection into another application (e.g., a printing app), navigate to a second page of the article, select content on that second page, copy/paste the selection into the application, etc., for all of the pages that the article is spread across.

Accordingly, in embodiments, automatic selection based on entity detection is enabled. The automatic stitching of multiple pages of content to perform a selection is also enabled. The automatic stripping of unrelated content from selection (e.g., ads, etc.) may be performed. The user is provided with the ability to tap/click and select multiple dis-contiguous sets of content.

Embodiments may be implemented in various environments. For instance, FIG. 1 shows a block diagram of communication system 100 in which a computing device 102 includes an entity based content selection system 108, according to an example embodiment. As shown in FIG. 1, communication system 100 includes a computing device 102 and a server 104. A network 106 communicatively couples computing device 102 and server 104. Computing device 102 includes entity based content selection system 108 and a display device 112. Server 104 includes a document analyzer 110. Server 104 is present in some embodiments. System 100 is further described as follows.

Computing device 102 may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, a Palm® device, a Blackberry® device, etc.), a wearable computing device (e.g., a smart watch, a head-mounted device including smart glasses such as Google® Glass™, etc.), or other type of mobile device (e.g., an automobile), or a stationary computing device such as a desktop computer or PC (personal computer). Still further, computing device 102 may be a portable media player, a stationary or handheld gaming console, a personal navigation assistant, a camera, or other type of stationary or mobile device. Although a single computing device is shown in FIG. 1, in other embodiments, other numbers of computing devices may be present in system 100, including tens, hundreds, thousands, and millions of client devices.

Server 104 may be formed of any number of individual server devices, including tens, hundreds, and thousands of servers.

Each of computing device 102 and server 104 may include at least one network interface that enables communications over network 106. Such a network interface may be one or more of any type of network interface (e.g., network interface card (NIC)), wired or wireless, such as an as IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein. Examples of network 106 include a local area network (LAN), a wide area network (WAN), a personal area network (PAN), and/or a combination of communication networks, such as the Internet.

Entity based content selection system 108 is configured to enable a user at computing device 102 to select content in a displayed document, such as content 116 in a displayed document 114 that is displayed by display device 112, in a more efficient manner than in conventional techniques. A user may cause an entity based content selection mode to be initiated with regard to displayed document 114. For instance, the user may attempt to select one or more textual words, an image, etc., of content 116 to cause the selection mode to be initiated, may interact with (e.g., touch, click on, speak a predetermined word or phrase, make a predetermined gesture, etc.) a control displayed by display device 112 to cause the selection mode to be initiated, or may cause the selection mode to be initiated in another way. Entity based content selection system 108 is invoked in the selection mode. When invoked, entity based content selection system 108 may automatically segment content 116 in displayed document 114 into a plurality of entities. Each entity includes a discrete and non-negligible portion of content 116, such as a paragraph of text, an image/photo, a video, etc. The user may have selected a portion of content 116 when initiating the selection mode, or may select a portion of the content. Examples of the selected content include one or more textual words, a single image, etc. In an embodiment, entity based content selection system 108 may automatically determine one or more entities associated with the selected portion of content.

For example, entity based content selection system 108 may determine that an entity that is a paragraph containing a word selected by the user is associated with the selected word, and thus may automatically indicate the paragraph as associated with the selected portion of content. Entity based content selection system 108 may determine that an entity that is an image is associated with a selected word, and thus may automatically indicate the image as associated with the selected portion of content. Entity based content selection system 108 may determine that an entity that is a paragraph is associated with a selected image, and thus may automatically indicate the paragraph as associated with the selected portion of content. Still further, entity based content selection system 108 may determine that an entity that is a second image is associated with a selected image, and thus may automatically indicate the image as associated with the selected portion of content. Any number of entities may be automatically determined by entity based content selection system 108 to be associated with a selected portion of content.

Note that in one embodiment, entity based content selection system 108 may directly make the determinations of the plurality of entities that make up content 116 and of the one or more entities associated with a content selection made by the user. In another embodiment, entity based content selection system 108 may request that document analyzer 110 at server 104 make one or both of the determinations. For instance, as shown in FIG. 1, entity based content selection system 108 may transmit an information request 118 from computing device 102, through network 106, to server 104, to have document analyzer 110 make one or both of the determinations. Document analyzer 110 may process information request 118, and may generate information response 120. Information response 120 includes the indication of the plurality of entities that make up content 116 and/or the one or more entities determined to be associated with a content selection made by the user. Information response 120 is transmitted from server 104, through network 106, to entity based content selection system 108 at computing device 102.

The plurality of entities may be indicated to the user in displayed document 114, as well as the portion of content selected by the user. The one or more entities determined to be associated with the selected content may be shown as active in displayed document 114. The user may be enabled to modify the active entities, such as by interacting with displayed document (e.g., by touch, mouse click, speaking, gesturing, etc.) to indicate further entities as active and/or to remove one or more entities from being indicated as active.

When the user is satisfied, the user may perform an action with regard to the active entities, such as copying the active entities to an electronic clipboard, printing the active entities, etc.

Figure 2:
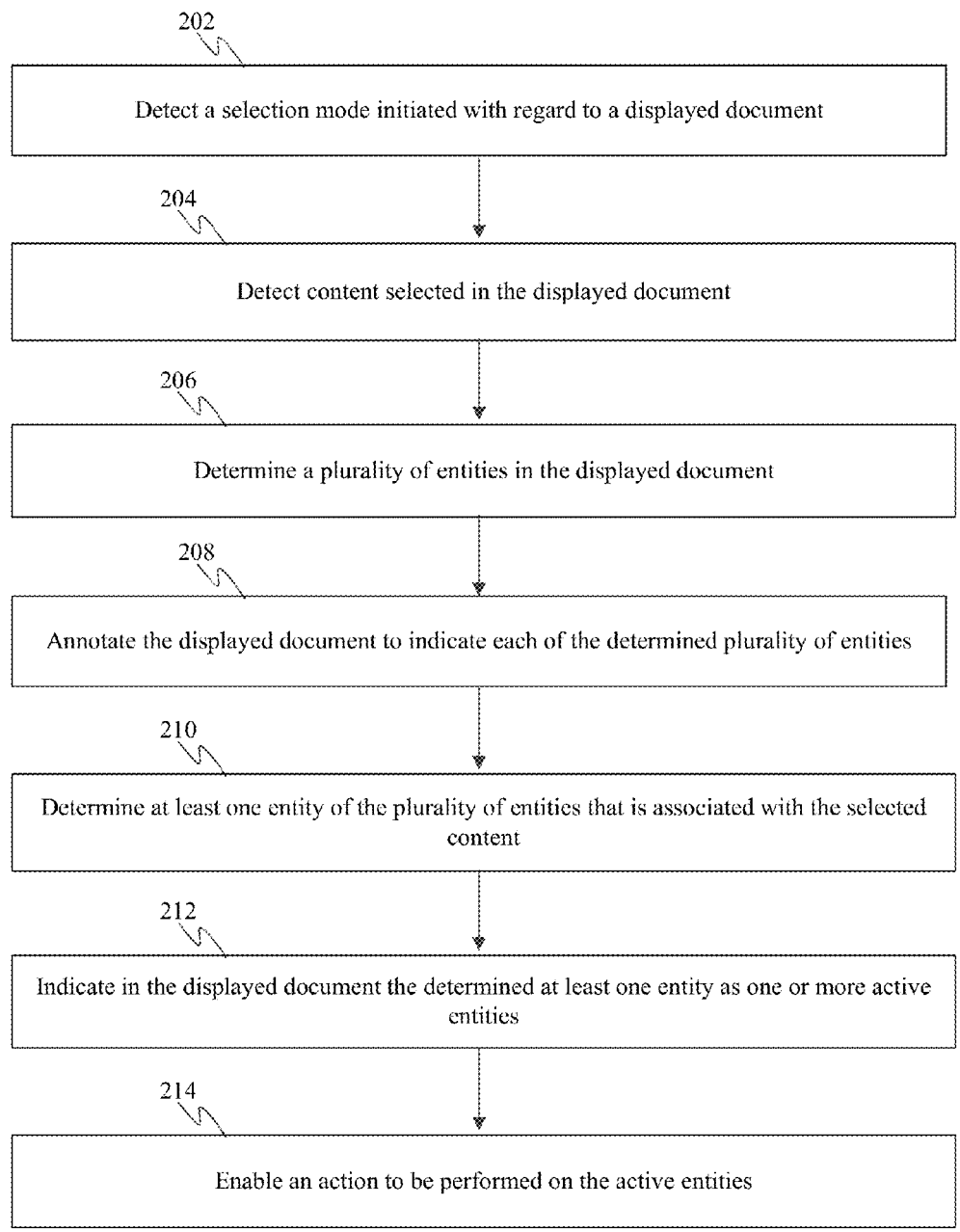
FIG. 2 shows a flowchart providing a process for entity based selection of content in a displayed document, according to an example embodiment.
Figure 3:
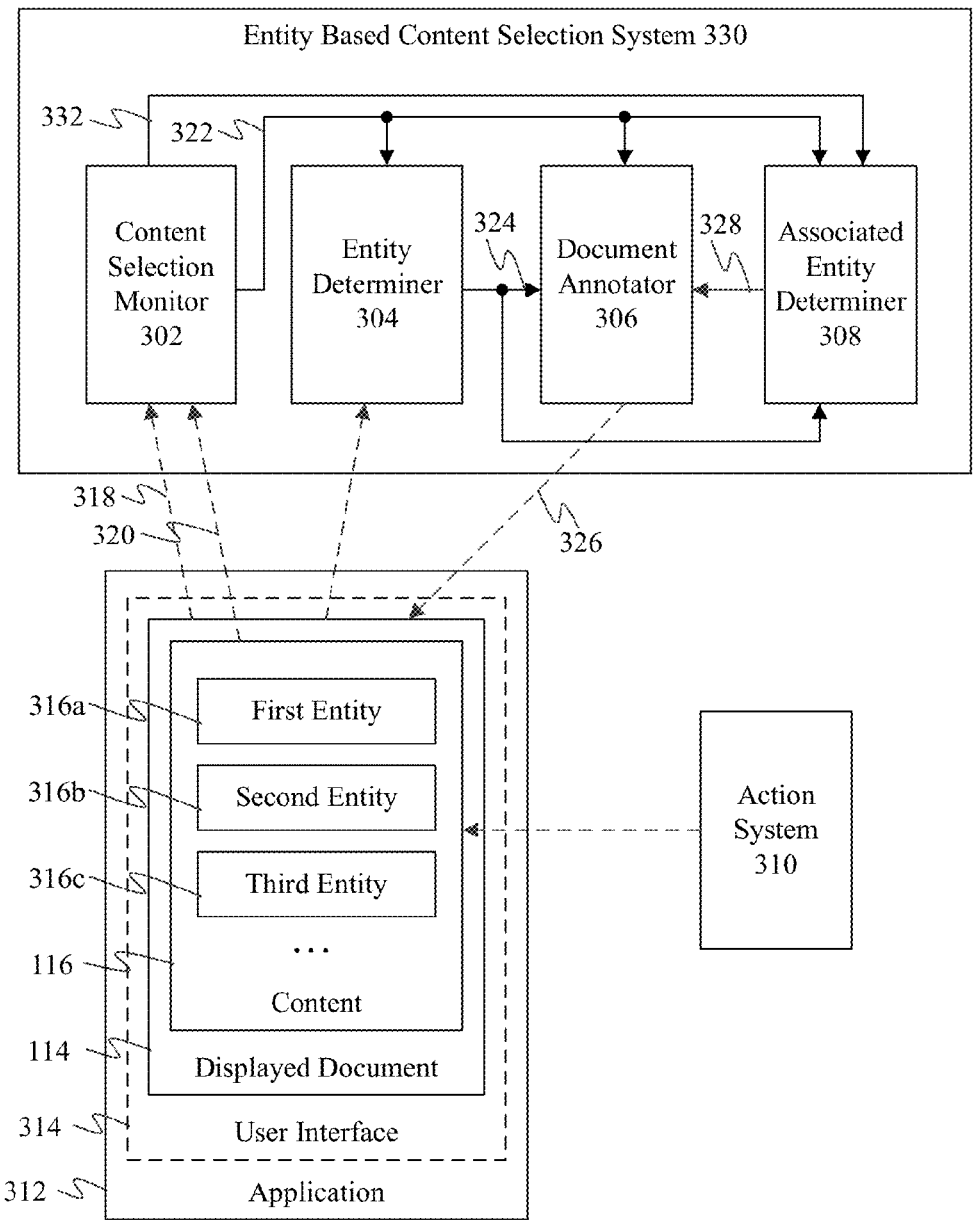
FIG. 3 shows a block diagram of a computing device that includes an entity based content selection system that enables entity based selection of content in a displayed document, according to an example embodiment.

In embodiments, entity based content selection system 108 of FIG. 1 may be configured in various ways, and may operate in various ways, to enable entity based content selection. For instance, FIG. 2 shows a flowchart 200 providing a process for entity based selection of content in a displayed document, according to an example embodiment. Entity based content selection system 108 may operate according to flowchart 200 in embodiments. For illustrative purposes, flowchart 200 is described below with respect to FIG. 3. FIG. 3 shows a block diagram of a computing device 300 that includes an entity based content selection system 330 that enables entity based selection of content 116 in displayed document 114, according to an example embodiment. Entity based content selection system 330 is an example of entity based content selection system 108 of FIG. 1. As shown in FIG. 3, computing device 300 includes display an action system 310, an application 312, and entity based content selection system 330. Application 312 displays displayed document 114. For instance, application 312 may display displayed document 114 in a user interface 314. Furthermore, entity based content selection system 330 includes a content selection monitor 302, an entity determiner 304, a document annotator 306, and an associated entity determiner 308.

Note that the steps of flowchart 200 may be performed in orders other than shown in FIG. 2. Further structural and operational embodiments will be apparent to persons skilled in the relevant art(s) based on the following description of FIGS. 2 and 3.

Furthermore, note that in embodiments, entity based content selection system 330 may be separate from application 312 as shown in FIG. 3, or may be integrated in application 312. For example, when separate, entity based content selection system 330 may be included in an operating system or another application of computing device 300, or may be a standalone application. Examples of application 312 include a web browser, a desktop application, a mobile app, or other type of application in which displayed document 114 may be displayed. When application 312 is a web browser, and entity based content selection system 330 is integrated therein, entity based content selection system 330 may be a plug in or add-in, or may be directly integrated in the program code of the web browser. Examples of web browsers applicable to application 312 include Internet Explorer®, developed by Microsoft Corp. of Redmond, Wash., Mozilla Firefox®, developed by Mozilla Corp. of Mountain View, Calif., Safari®, developed by Apple Inc. of Cupertino, Calif., and Google® Chrome of Mountain View, Calif.

Flowchart 200 of FIG. 2 begins with step 202. In step 202, a selection mode initiated with regard to a displayed document is detected. For example, as shown in FIG. 3, content selection monitor 302 may be configured to detect that an entity based content selection mode has been initiated by a user with respect to displayed document 114. As shown in FIG. 3, content selection monitor 302 may detect (or receive an indication of) the initiation of the selection mode as indicated by a detected selection mode indication 318. Content selection monitor 302 may generate a selection mode notification 322 to inform other components of entity based content selection system 330 that the selection mode is initiated. When the entity based content selection mode is initiated, this means automatic assistance in selecting displayed content will be provided to the user. The user can select displayed content, may be enabled to refine their selection, and additional content related to the selected content is automatically determined and indicated to the user. The content is automatically determined and indicated to the user at an entity level, by segmenting the content presented to the user into entities, and determining one or more of the segmented entities that are related to the content selected by the user.

In embodiments, various mechanisms may be used to initiate the selection mode, which may be detected by content selection monitor 302. For example, content selection monitor 302 may detect that the user interacted with a control displayed or otherwise provided by user interface 314 with respect to displayed document 114. For instance, content selection monitor 302 may detect that the user touched, clicked on, spoke a predetermined word or phrase, made a predetermined gesture, or otherwise interacted with a control to initiate the selection mode. Examples of a graphical control that the user may interact with to initiate the entity based content selection mode include a touchable or clickable button, pop up menu item, pull down menu item, or other graphical user interface element.

In another embodiment, content selection monitor 302 may detect that the user attempted to select one or more textual words, an image, etc., of content 116 displayed in displayed document 114. In such an embodiment, just by a user attempting to select content in a displayed document, a selection mode may be initiated. In other embodiments, content selection module 302 may detect that the user initiated the selection mode in other ways.

Note that in some embodiments, content selection monitor 302 may directly detect the initiation of the selection mode. In another embodiment, application 312 may detect the initiation of the selection mode. For example, in an embodiment, application 312 may detect the initiation of the selection mode, and may indicate the detection to content selection monitor 302.

Referring back to FIG. 2, in step 204, content selected in the displayed document is detected. In an embodiment, content selection monitor 302 may be configured to detect content selected in displayed document 114. As shown in FIG. 3, content selection monitor 302 may detect (or receive an indication of) particular content selected in displayed document 114 as indicated by a detected selected content 320. For example, a user may interact with user interface 314 to select a portion of content 116 displayed in displayed document 114. The user may select a word, a set of words, an image, a video, or other portion of content 116. The user may select the content in any manner using user interface 314, such as by touch, pointer click, voice, gesture, or in any other manner. Furthermore, the user may be enabled to adjust or modify the content selected by the user by interacting with a user interface (e.g., user interface 314 of FIG. 3), such as by adding additional words, images, videos, etc. to their selection using any suitable mechanism (e.g., dragging slider bars, mouse clicks, screen touches, etc.). The content selected by the user is output from content selection monitor 302 as selected content 332.

Note that in some embodiments, content selection monitor 302 may directly detect the selection of content. In another embodiment, application 312 may detect the selection of content, and may indicate to content selection monitor 302 the particular content that was selected.

Note that step 204 may be performed before, after, or simultaneously with step 202. In other words, the user may select content in the displayed document before, after, and/or at the same time the entity based content selection mode is initiated.

Referring back to FIG. 2, in step 206, a plurality of entities in the displayed document is determined. Entity determiner 304 shown in FIG. 3 may receive selection mode notification 322, which indicates that the entity based content selection mode is initiated. In response, entity determiner 304 may retrieve displayed document 314 to analyze displayed document 314 for entities. As described elsewhere herein, an entity is a discrete and non-negligible portion of content 116 (e.g., greater than a single word), a segment of content 116 having an identifiable content form, such as that of a paragraph of text, an image/photo, a video, etc. In an embodiment, entity determiner 304 may retrieve the underlying one or more files that are rendered to cause displayed document 314 to be displayed, which may include one or more markup language documents (e.g., files containing code of hypertext markup language (HTML), extensible markup language (XML), etc.), files containing other forms of program code, script files, image files, video files, audio files, etc. Entity determiner 304 is configured to analyze the files making up displayed document 314 for entities.

Figure 4:
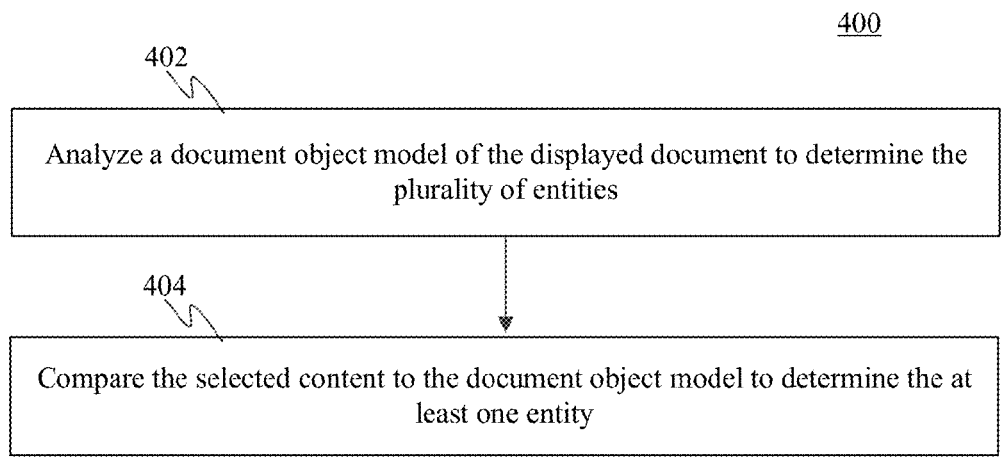
FIG. 4 shows a block diagram of an entity determiner and associated entity determined configured to automatically determine entities that are associated with selected content, according to an example embodiment.
Figure 5:
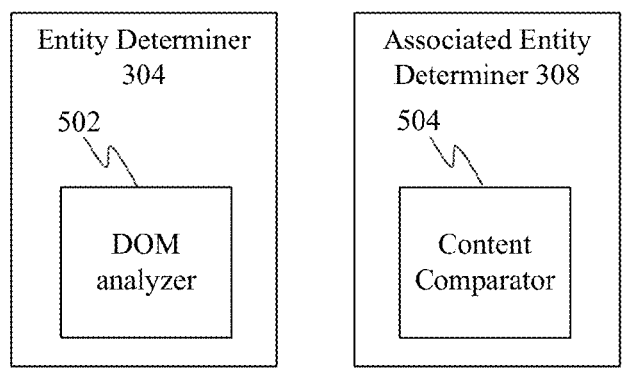
FIG. 5 shows a block diagram of a displayed document that is segmented into entities, and first and second entities have been selected, according to an example embodiment.

Entity determiner 304 may be configured to analyze displayed document 314 for entities in any manner. For example, FIG. 4 shows a flowchart 400 providing a process for automatically determining entities that are associated with selected content, according to an example embodiment. Furthermore, FIG. 5 shows a block diagram of entity determiner 304 configured to automatically determine entities that are associated with selected content, according to an example embodiment. In an embodiment, entity determiner 304 may include a document object model (DOM) analyzer 502, as shown in FIG. 5, that is configured to perform step 402 of FIG. 4. In step 402, a document object model of the displayed document is analyzed to determine the plurality of entities. In an embodiment, DOM analyzer 502 may be configured to analyze a DOM of displayed document 114 to determine a plurality of entities contained therein. A DOM is a convention for representing objects in a markup language document, though a document model is also applicable to other forms of displayed document 114, in embodiments. The DOM of displayed document 114 may have a tree structure that may be parsed by entity determiner 304 to determine objects, such as articles (e.g., a series of related paragraphs of text), images, videos, and further types of objects. Each determined object may be indicated as an entity by DOM analyzer 502. Furthermore, some determined objects may be segmented into further entities by DOM analyzer 502. For instance, an article determined to be an object, and therefore an entity, may be segmented into the plurality of paragraphs that form the article, and each paragraph may be separately indicated as an entity. Furthermore, an articles that is indicated as an entity may include one or more images and/or other objects, and each of those images and/or objects may be separately indicated as an entity. As shown in FIG. 3, entity determiner 304 outputs determined entities 324, which indicates the identified entities of content 116.

Example HTML pseudo code is shown below that illustrates an example technique for determining entities:

```
<HTML>
    <Body>
        <h1>Article Heading</h1>
        <div class = "style1">
            <img>imagefile</img>
            <h1>First Section</h1>
                <p>First Paragraph Text</p>
                <p>Second Paragraph Text</p>
                <p>Third Paragraph Text</p>
        <div class = "style2">
            <h1>Second Section</h1>
                <p>Fourth Paragraph Text</p>
                <p>Fifth Paragraph Text</p>
                <p>Sixth Paragraph Text</p>
        <div>
        ....
```

In an embodiment, DOM analyzer 502 is enabled to determine a tree structure from the above pseudo code by searching for known document section/object identifiers, such as "img" (for images), "p" (for paragraphs), "div" (for logical divisions), etc. For instance, in the above example, DOM analyzer 502 may determine the pseudo code defines an article titled "Article Heading" at the highest level. At a medium level of the tree, an image included in "imagefile" and a pair of sections titled "First Section" and "Second Section," respectively, may be determined. At a lowest level, DOM analyzer 502 may determine that both of the sections include three paragraphs of text. Accordingly, DOM analyzer 502 may designate the image and each of the six paragraphs as separate entities. Furthermore, DOM analyzer 502 may designate both of the sections as entities themselves, and well as designating the entire article as an entity. Each determined entity is identified in determined entities 324.

In FIG. 3, content 116 of displayed document 114 is shown segmented into an example plurality of entities identified by entity determiner 304, including a first entity 316a, a second entity 316b, and a third entity 316c. Any number of entities may be identified in content 116, including numbers of entities in the tens and hundreds.

Referring back to FIG. 2, in step 208, the displayed document is annotated to indicate each of the determined plurality of entities. In an embodiment, document annotator 306 may receive selection mode notification 322 (indicating that the entity based content selection mode is initiated) and determined entities 324. In response, document annotator 306 may annotate the appearance of displayed document 114 to indicate the entities of determined entities 324. Displayed document 114 may be annotated in any manner to indicate the determined entities, such as by highlighting the determined entities with graphics and/or text, and/or emphasizing the determined entities in another manner. Document annotator 306 may also annotate displayed document 114 to deemphasize other objects of displayed document 114 that are not determined to be entities, such as advertisements, etc., by whiting, greying, or blacking them out, removing them from selection mode view, etc.

As shown in FIG. document annotator 306 generates an annotate signal 326 that causes the determined entities to be annotated in displayed document 114. In one embodiment, annotate signal 326 causes the annotations directly. In another embodiment, annotate signal 326 instructs application 312 to make the annotations in user interface 314.

Figure 6:
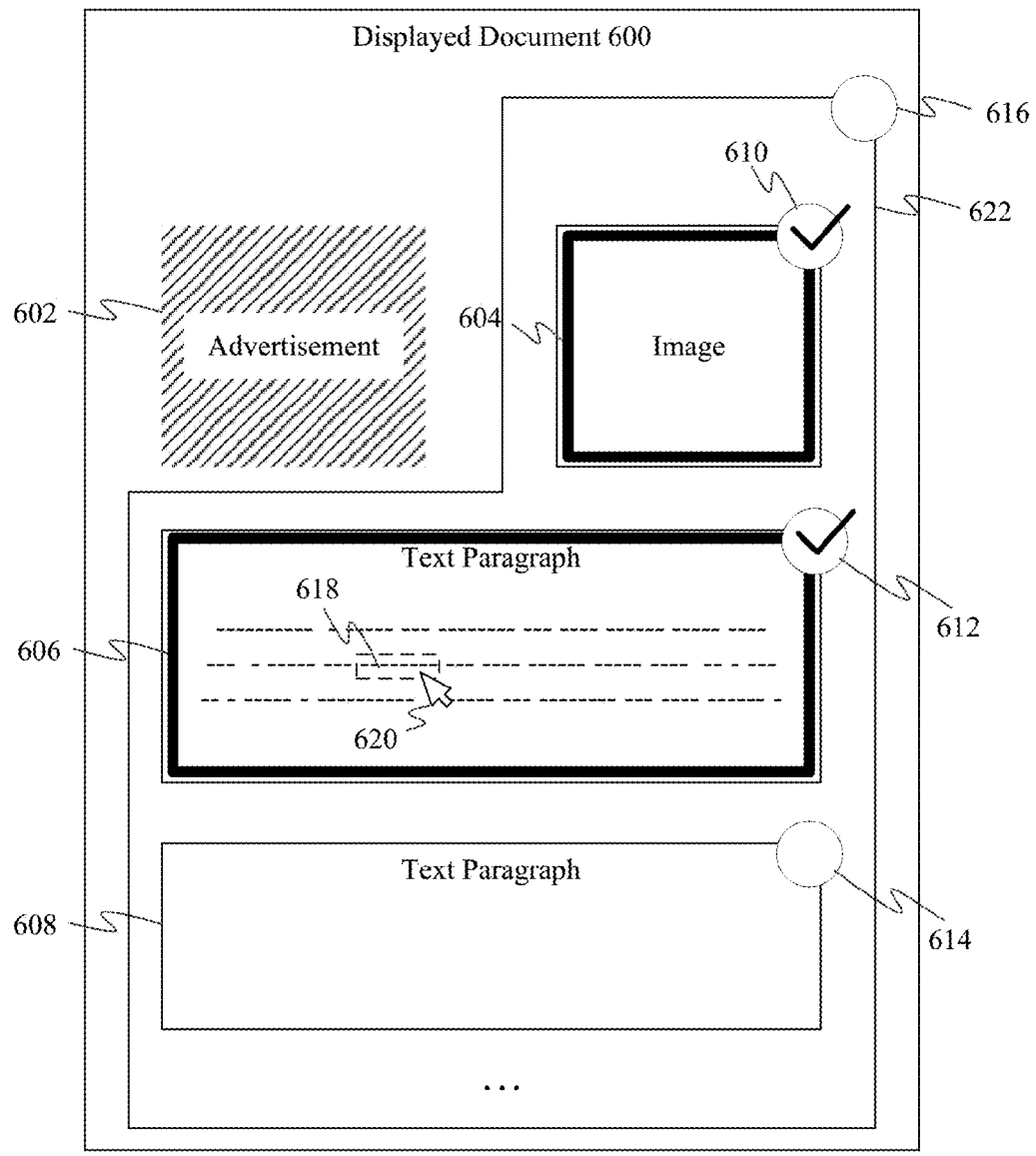
FIG. 6 shows a flowchart providing a process for automatically determining entities that are associated with selected content, according to an example embodiment.

A displayed document 114 may be annotated by document annotator 306 to indicate determined entities in various ways. For instance, FIG. 6 shows a block diagram of a displayed document 600 that has been annotated with entities, according to an example embodiment. Displayed document 600 may be displayed by application 312 (e.g., a web browser), in an embodiment. As shown in FIG. 6, displayed document 600 includes an advertisement 602, an image 604, a first text paragraph 606, a second text paragraph 608, and an article 622 (that contains image 604, first text paragraph 606, and second text paragraph 608). Any number of additional objects may be present in displayed document 600 that are not shown in FIG. 6 for brevity of illustration.

As shown in FIG. 6, image 604, first text paragraph 606, second text paragraph 608, and article 622 are indicated as determined entities, while advertisement 602 is not indicated as an entity. In particular, image 604, first text paragraph 606, second text paragraph 608, and article 622 are outlined and not shaded, which indicates image 604, first text paragraph 606, and second text paragraph 608 as entities in this example. In other embodiments, entities may be indicated in other ways, such as by using symbols, particular shading, colors, textual indications, etc. Advertisement 602 is not outlined and is shaded in displayed document 600, which indicates advertisement 602 as not being an entity. In other embodiments, advertisements and other objects that do not relate to the substantive content of displayed document 600 may be indicated as not being entities in other ways (e.g., symbols, other shading, colors, textual indications, etc.). By not including advertisement 602 as an entity, advertisement 602 is conveniently prevented from being included in any actions that might be desired to be performed on entities, such as printing, copying, messaging, etc.

Referring back to FIG. 2, in step 210, at least one entity of the plurality of entities is determined that is associated with the selected content. In an embodiment, associated entity determiner 308 may receive selection mode notification 322 (indicating that the entity based content selection mode is initiated), determined entities 324, and selected content 332. In response, associated entity determiner 308 may analyze determined entities 324 to determine one or more entities that are associated with the content selected by the user as indicated by selected content 332. As shown in FIG. 3, associated entity determiner 308 may generate associated entities 328, which indicates the entities of determined entities 324 determined to be associated with selected content 332.

Associated entity determiner 308 may be configured to analyze determined entities 324 to determine one or more entities associated with selected content 332 in any manner. For example, in an embodiment, associated entity determiner 308 may be configured to perform step 404 shown in FIG. 4 and/or may include a content comparator 504, as shown in FIG. 5.

In step 404, the selected content is compared to the document object model to determine the at least one entity. In an embodiment, content comparator 504 may be configured to compare selected content 332 to the entities of determined entities 324 to find correlations. In one embodiment, content comparator 504 may be configured to perform key word comparisons. For instance, where selected content 332 is a set of words, such as "space needle", content comparator 504 may be configured to perform a key word comparison with textual content of determined entities 324, such as paragraphs, headings, etc., as well as with metadata associated with non-textual entities such as images, videos, etc. In embodiments, when a predetermined number of matches is made (e.g., five instances of "space needle" in a paragraph entity, an instance of "space needle" in metadata of an image), the matching entity/entities is/are identified as associated with selected content 332.

In another embodiment, content comparator 504 may be configured to assess a meaning (e.g., a context) of each determined entity and a meaning of selected context 332, and may compare the meanings to determine associations. For example, first entity 316*a* in FIG. 3 may be a paragraph of text that discusses sewing needles and the need to space apart seams, while second entity 316*b* may be a paragraph of text that discusses the Seattle Space Needle. Content comparator 504 may contain a meaning/context analyzer that determines the context of these two paragraphs—"sewing" and "Seattle Space Needle", and a meaning/context comparator that compares the determined contexts to the selected content of "space needle" to determine that second entity 316*b* is a match.

Content comparator 332 may be configured to perform any type of algorithm or technique to determine a context/meaning of text, images, etc., such as contextual awareness algorithms, semantic analysis algorithms, scene analysis (for images, video), etc., as would be known to persons skilled in the relevant art(s).

Note that in the embodiment of FIG. 5, entity determiner 304 and associated entity determiner 308 of entity based content selection system 108 are configured to perform steps 402 and 404 of flowchart 400 (FIG. 4), respectively. In another embodiment, document analyzer 110 of server 104 (FIG. 1) may be configured to perform step 402 and/or step 404. For example, as described above with respect to FIG. 1, entity based content selection system 108 may transmit an information request 118 from computing device 102, through network 106, to server 104, to have document analyzer 110 perform one or both of steps 402 and 404. Information request 118 may include displayed document 114 (e.g., the one or more files that are rendered to form displayed document 114) and selected content 332. Document analyzer 110 may process information request 118, and may generate information response 120. Information response 120 includes the indication of determined entities 324 and/or associated entities 328. Information response 120 is transmitted from server 104, through network 106, to entity based content selection system 108 at computing device 102.

Figure 7:
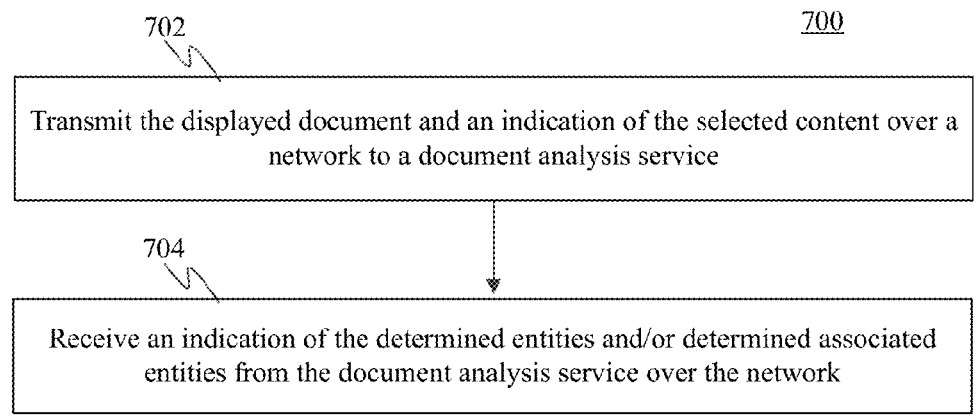
FIG. 7 shows a flowchart providing a process for accessing a cloud-based service to automatically determine entities that are associated with selected content, according to an example embodiment.
Figure 8:
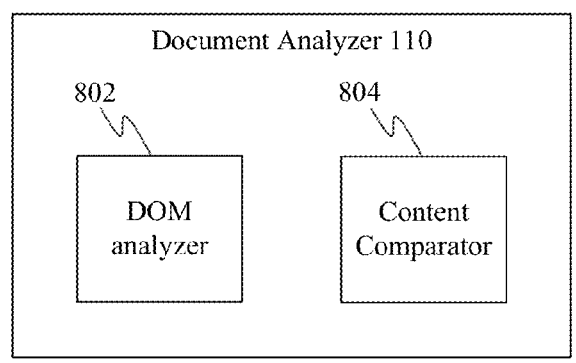
FIG. 8 shows a block diagram of a document analyzer at a cloud-based service, according to an example embodiment.

For example, FIG. 7 shows a flowchart 700 providing a process for accessing a cloud-based service to automatically determine entities that are associated with selected content, according to an example embodiment. In an embodiment, entity based content selection system 330 may access a communication interface of computing device 102 (FIG. 1) to perform flowchart 700. Furthermore, FIG. 8 shows a block diagram of document analyzer 110 at a cloud-based service such as server 104 (FIG. 4), according to an example embodiment. As shown in FIG. 8, document analyzer 110 includes a DOM analyzer 802 and a content comparator 804. Flowchart 700 and document analyzer 110 of FIG. 8 are described as follows.

Flowchart 700 begins with step 702. In step 702, the displayed document and an indication of the selected content are transmitted over a network to a document analysis service. In an embodiment, as shown in FIG. 1, information request 118 (which may include displayed document 114 and/or selected content 332) may be transmitted from computing device 102, through network 106, to server 104. DOM analyzer 802 (FIG. 8) of document analyzer 110 may be configured similarly to DOM analyzer 502 (FIG. 5) to perform step 402 of flowchart 400.

As such, DOM analyzer 802 may determine a plurality of entities included in displayed document 114, and may generate determined entities 324 to indicate the determined entities. Furthermore, content comparator 804 may be configured similarly to content comparator 504 (FIG. 5) to perform step 404 of flowchart 400. As such, content comparator 804 may determine one or more of determined entities 324 that is/are associated with selected content 332, and may generate associated entities 328 to indicate the associated entities. Document analyzer 110 may include determined entities 324 generated by DOM analyzer 802 and/or associated entities 328 determined by content comparator 802 in information response 120.

In step 704, an indication of the determined entities and/or determined associated entities is/are received from the document analysis service over the network. As shown in FIG. 1, information response 120 (including one or both of determined entities 324 and/or associated entities 328) is transmitted from server 104, through network 106, to entity based content selection system 108 at computing device 102.

In step 212, the determined at least one entity is indicated in the displayed document as one or more active entities. In an embodiment, document annotator 306 may receive associated entities 328, and may annotate the appearance of displayed document 114 to indicate the entities determined to be associated with the selected content as active entities. Displayed document 114 may be annotated in any manner to indicate the active entities, such as by highlighting the active entities with graphics and/or text, and/or emphasizing the active entities in another manner. As shown in FIG. document annotator 306 may generate annotate signal 326 to cause the associated entities to be annotated in displayed document 114 as active. In one embodiment, annotate signal 326 causes the associated entities to be indicated in displayed document 114 directly. In another embodiment, annotate signal 326 instructs application 312 to make the annotations in user interface 314.

Continuing the example of FIG. 6, displayed document 600 shows an embodiment where entities determined to be associated with selected content are indicated as active. In the example of FIG. 6, a selected word 618 was detected to be selected by a user in text paragraph 606 (in step 204 of FIG. 2). In the illustrated example, selected word 618 was selected by a user that interacted with a pointer 620, but in other embodiments, selected word 618 may be selected in other ways, such as by touch, voice, gesture, etc. As described above, image 604, first text paragraph 606, second text paragraph 608, and article 622 are indicated as determined entities (in step 206 of FIG. 2). In an embodiment, in step 210 of FIG. 2, associated entity determiner 308 determines image 604 and first text paragraph 606 to be entities associated with selected word 618. For example, first text paragraph 606 may be determined to be associated with selected word 618 because selected word 618 is contained within, because selected word 618 is descriptive of a topic of first text paragraph 606, and/or for other reason. Image 604 may be determined to be associated with selected word 618 due to having associated metadata that matches selected word 618, because image 604 shows a scene and/or objects related to selected word 618, and/or for other reason. Accordingly, in step 212, image 604 and first text paragraph 606 are indicated in displayed document 114 as active entities that are associated with selected word 618.

In the example of FIG. 6, image 604 and first text paragraph 606 are indicated as active entities by each having an outline that is darker (e.g., a dark rectangle) relative to unassociated/non-active entities. Furthermore, image 604 and first text paragraph 606 each have controls that indicate that they are active. For instance, as shown in FIG. 6, a first control 610, second control 612, third control 614, and fourth control 616 are shown, that are each associated with a respective entity. First control 610 is located in a top right corner of image 610, second control 612 is located in a top right corner of text paragraph 606, third control 614 is located in a top right corner of text paragraph 608, and fourth control 616 is located in a top right corner of displayed document 600. Each control can be toggled on or off to indicate whether the respective entity is active or not. For example, a check symbol in a control indicates the corresponding entity is active, whereas if the check is not present in a control, this indicates the corresponding entity is not active. Thus, in the example of FIG. 6, there is a check symbol shown in both of controls 610 and 612, which indicates that image 604 and text paragraph 606 are active entities.

Not that in an embodiment, although an initial set of active entities is automatically determined in step 210, and indicated in a displayed document in step 212, a user may be enabled to refine, modify, or alter the set of active entities. The user may be enabled to do this in any manner, such as by interacting with a user interface (e.g., user interface 314 shown in FIG. 3. For instance, with respect to FIG. 6, the user may be able to interact with an entity and/or its associated control (when present) to toggle whether or not the entity is active. For example, in FIG. 6, a user may be enabled to touch text paragraph 606 and/or touch control 612, to toggle text paragraph 606 between being indicated as active (check symbol shown) or not active (check symbol not shown).

In this manner, a user may be enabled to select content in a displayed document, may be enabled to manually refine that selection (optionally), and may have content associated with the selected content be automatically determined and indicated in the displayed document. On an entity-by-entity basis, the user may add or subtract entities from being indicated as active. Advertisements and other objects that are not part of the context of the displayed document may be automatically filtered out, and not indicated as entities. Accordingly, an automatic manner of selecting content of interest to a user in a document is provided, such that the user can select a relatively small amount of content, to have a larger amount of content automatically selected. The automatically selected content may include content that is not contiguous (e.g., image 604 and text paragraph 608 could be the only active entities), and can include different forms of content (e.g., text, images, videos, etc.).

Referring back to FIG. 2, in step 214, an action is enabled to be performed on the active entities. In an embodiment, a user may desire to perform an action on the set of active entities, such as adding the selection to an electronic clipboard, adding the selection to another document or spreadsheet, adding the selection to an email or other message, sending the selection to a print queue for printing, etc. In an embodiment, action system 310 may be present to enable one or more actions to be performed on the active entities. For instance, action system 310 may provide an interface for invoking an action that action system 310 contains or for calling an action that is implemented elsewhere. Accordingly, action system 310 may include or call an electronic clipboard, another document or spreadsheet processing tool, an email tool, texting tool, or other messaging tool, a printing tool, etc.

When the user is finished, the user may exit the selection mode. For example, when in the selection mode detected to be initiated in step 202 (FIG. 2), a control may be displayed that the user can interact with to exit the selection mode. Alternatively, the user may navigate away from the document, may select a displayed object outside of the document, and/or may be enabled to exit the selection mode in any other suitable manner.

III. Example Mobile and Stationary Device Embodiments

Computing device 102, server 104, entity based content selection system 108, document analyzer 110, content selection monitor 302, entity determiner 304, document annotator 306, associated entity determiner 308, action system 310, application 312, entity based content selection system 330, DOM analyzer 502, content comparator 504, DOM analyzer 802, content comparator 804, flowchart 200, flowchart 400, and flowchart 700 may be implemented in hardware, or hardware combined with software and/or firmware. For example, entity based content selection system 108, document analyzer 110, content selection monitor 302, entity determiner 304, document annotator 306, associated entity determiner 308, action system 310, application 312, entity based content selection system 330, DOM analyzer 502, content comparator 504, DOM analyzer 802, content comparator 804, flowchart 200, flowchart 400, and/or flowchart 700 may be implemented as computer program code/instructions configured to be executed in one or more processors and stored in a computer readable storage medium. Alternatively, entity based content selection system 108, document analyzer 110, content selection monitor 302, entity determiner 304, document annotator 306, associated entity determiner 308, action system 310, application 312, entity based content selection system 330, DOM analyzer 502, content comparator 504, DOM analyzer 802, content comparator 804, flowchart 200, flowchart 400, and/or flowchart 700 may be implemented as hardware logic/electrical circuitry.

For instance, in an embodiment, one or more, in any combination, of entity based content selection system 108, document analyzer 110, content selection monitor 302, entity determiner 304, document annotator 306, associated entity determiner 308, action system 310, application 312, entity based content selection system 330, DOM analyzer 502, content comparator 504, DOM analyzer 802, content comparator 804, flowchart 200, flowchart 400, and/or flowchart 700 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 9:
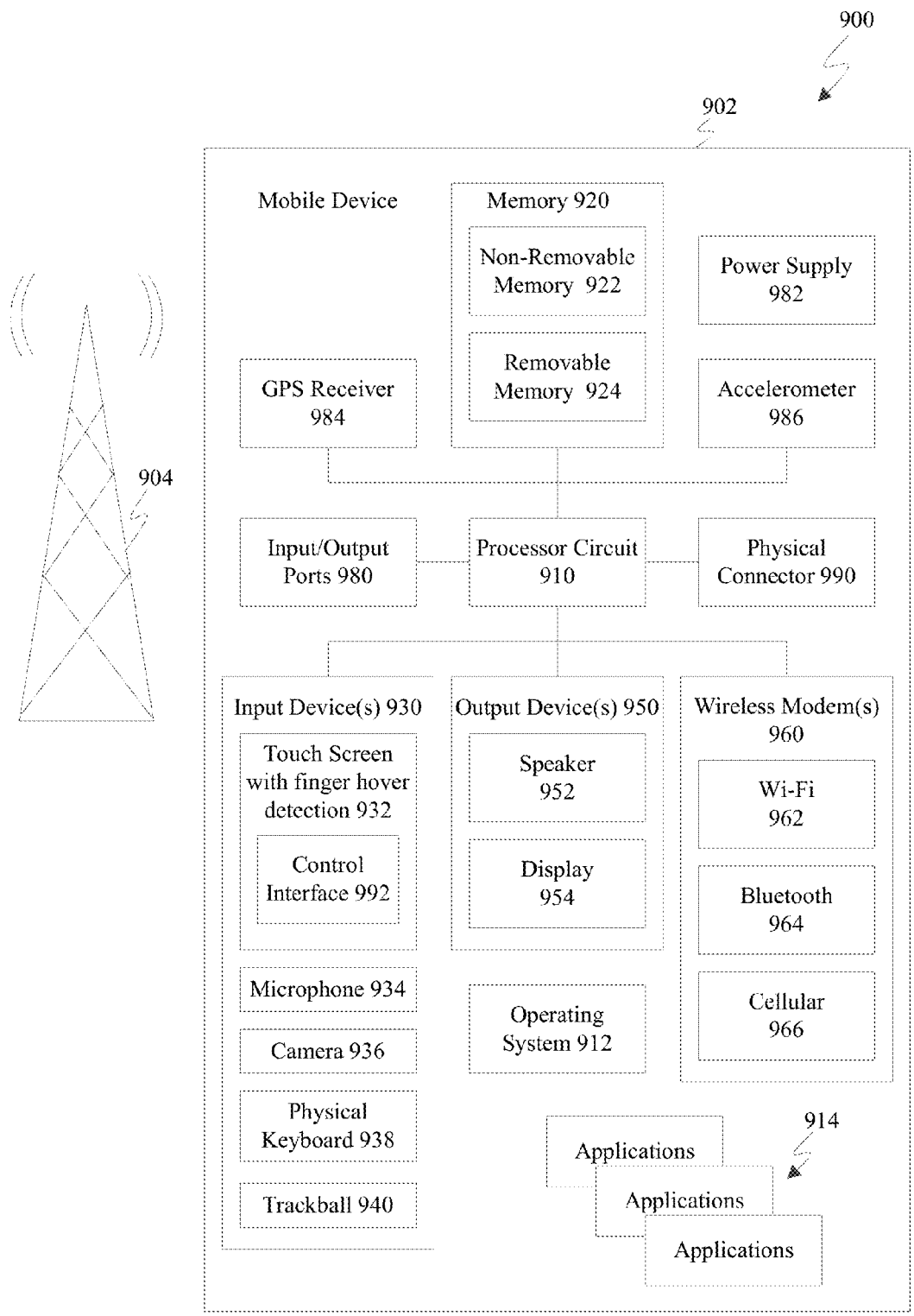
FIG. 9 shows a block diagram of an exemplary user device in which embodiments may be implemented.

FIG. 9 shows a block diagram of an exemplary mobile device 900 including a variety of optional hardware and software components, shown generally as components 902. For instance, components 902 of mobile device 900 are examples of components that may be included in computing device 102 (FIG. 1) in mobile device embodiments. Any number and combination of the features/elements of components 902 may be included in a mobile device embodiment, as well as additional and/or alternative features/elements, as would be known to persons skilled in the relevant art(s). It is noted that any of components 902 can communicate with any other of components 902, although not all connections are shown, for ease of illustration. Mobile device 900 can be any of a variety of mobile devices described or mentioned elsewhere herein or otherwise known (e.g., cell phone, smartphone, handheld computer, Personal Digital Assistant (PDA), etc.) and can allow wireless two-way communications with one or more mobile devices over one or more communications networks 904, such as a cellular or satellite network, or with a local area or wide area network.

The illustrated mobile device 900 can include a controller or processor referred to as processor circuit 910 for performing such tasks as signal coding, image processing, data processing, input/output processing, power control, and/or other functions. Processor circuit 910 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 910 may execute program code stored in a computer readable medium, such as program code of one or more applications 914, operating system 912, any program code stored in memory 920, etc. Operating system 912 can control the allocation and usage of the components 902 and support for one or more application programs 914 (a.k.a. applications, "apps", etc.). Application programs 914 can include common mobile computing applications (e.g., email applications, calendars, contact managers, web browsers, messaging applications) and any other computing applications (e.g., word processing applications, mapping applications, media player applications).

As illustrated, mobile device 900 can include memory 920. Memory 920 can include non-removable memory 922 and/or removable memory 924. The non-removable memory 922 can include RAM, ROM, flash memory, a hard disk, or other well-known memory storage technologies. The removable memory 924 can include flash memory or a Subscriber Identity Module (SIM) card, which is well known in GSM communication systems, or other well-known memory storage technologies, such as "smart cards." The memory 920 can be used for storing data and/or code for running the operating system 912 and the applications 914. Example data can include web pages, text, images, sound files, video data, or other data sets to be sent to and/or received from one or more network servers or other devices via one or more wired or wireless networks. Memory 920 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 920. These programs include operating system 912, one or more application programs 914, and other program modules and program data. Examples of such application programs or program modules may include, for example, computer program logic (e.g., computer program code or instructions) for implementing entity based content selection system 108, document analyzer 110, content selection monitor 302, entity determiner 304, document annotator 306, associated entity determiner 308, action system 310, application 312, entity based content selection system 330, DOM analyzer 502, content comparator 504, DOM analyzer 802, content comparator 804, flowchart 200, flowchart 400, and/or flowchart 700 (including any suitable step of flowcharts 200, 400, 700), and/or further embodiments described herein.

Mobile device 900 can support one or more input devices 930, such as a touch screen 932, microphone 934, camera 936, physical keyboard 938 and/or trackball 940 and one or more output devices 950, such as a speaker 952 and a display 954. Touch screens, such as touch screen 932, can detect input in different ways. For example, capacitive touch screens detect touch input when an object (e.g., a fingertip) distorts or interrupts an electrical current running across the surface. As another example, touch screens can use optical sensors to detect touch input when beams from the optical sensors are interrupted. Physical contact with the surface of the screen is not necessary for input to be detected by some touch screens. For example, the touch screen 932 may be configured to support finger hover detection using capacitive sensing, as is well understood in the art. Other detection techniques can be used, as already described above, including camera-based detection and ultrasonic-based detection. To implement a finger hover, a user's finger is typically within a predetermined spaced distance above the touch screen, such as between 0.1 to 0.25 inches, or between .0.25 inches and 0.05 inches, or between .0.5 inches and 0.75 inches or between 0.75 inches and 1 inch, or between 1 inch and 1.5 inches, etc.

The touch screen 932 is shown to include a control interface 992 for illustrative purposes. The control interface 992 is configured to control content associated with a virtual element that is displayed on the touch screen 932. In an example embodiment, the control interface 992 is configured to control content that is provided by one or more of applications 914. For instance, when a user of the mobile device 900 utilizes an application, the control interface 992 may be presented to the user on touch screen 932 to enable the user to access controls that control such content. Presentation of the control interface 992 may be based on (e.g., triggered by) detection of a motion within a designated distance from the touch screen 932 or absence of such motion. Example embodiments for causing a control interface (e.g., control interface 992) to be presented on a touch screen (e.g., touch screen 932) based on a motion or absence thereof are described in greater detail below.

Other possible output devices (not shown) can include piezoelectric or other haptic output devices. Some devices can serve more than one input/output function. For example, touch screen 932 and display 954 can be combined in a single input/output device. The input devices 930 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 912 or applications 914 can comprise speech-recognition software as part of a voice control interface that allows a user to operate the device 900 via voice commands. Further, device 900 can comprise input devices and software that allows for user interaction via a user's spatial gestures, such as detecting and interpreting gestures to provide input to a gaming application.

Wireless modem(s) 960 can be coupled to antenna(s) (not shown) and can support two-way communications between processor circuit 910 and external devices, as is well understood in the art. The modem(s) 960 are shown generically and can include a cellular modem 966 for communicating with the mobile communication network 904 and/or other radio-based modems (e.g., Bluetooth 964 and/or Wi-Fi 962). Cellular modem 966 may be configured to enable phone calls (and optionally transmit data) according to any suitable communication standard or technology, such as GSM, 3G, 4G, 5G, etc. At least one of the wireless modem(s) 960 is typically configured for communication with one or more cellular networks, such as a GSM network for data and voice communications within a single cellular network, between cellular networks, or between the mobile device and a public switched telephone network (PSTN).

Mobile device 900 can further include at least one input/output port 980, a power supply 982, a satellite navigation system receiver 984, such as a Global Positioning System (GPS) receiver, an accelerometer 986, and/or a physical connector 990, which can be a USB port, IEEE 1394 (FireWire) port, and/or RS-232 port. The illustrated components 902 are not required or all-inclusive, as any components can be not present and other components can be additionally present as would be recognized by one skilled in the art.

Figure 10:
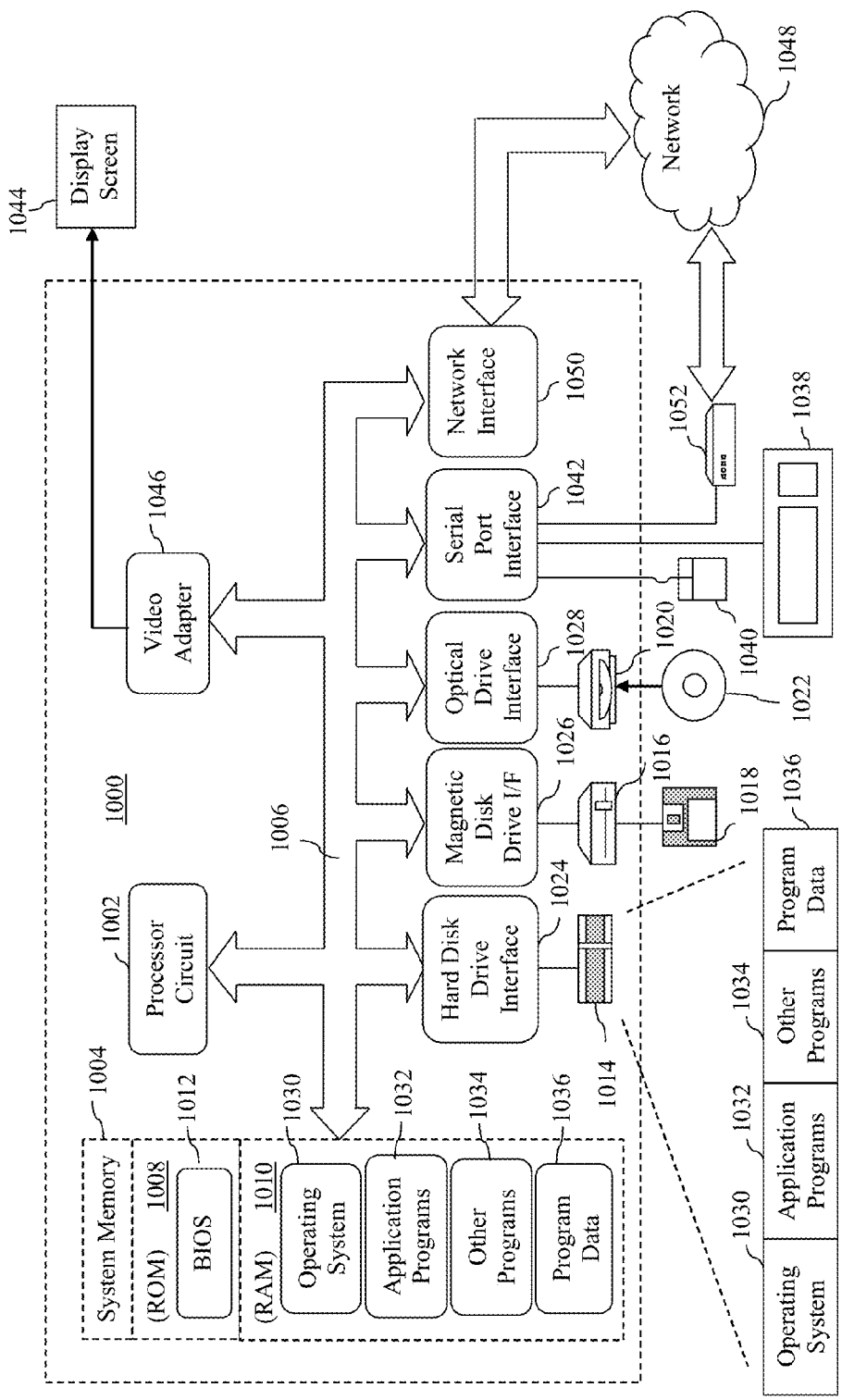
FIG. 10 shows a block diagram of an example computing device that may be used to implement embodiments.

Furthermore, FIG. 10 depicts an exemplary implementation of a computing device 1000 in which embodiments may be implemented. For example, computing device 102, server 104, server 106, and/or server 108 may be implemented in one or more computing devices similar to computing device 1000 in stationary computer embodiments, including one or more features of computing device 1000 and/or alternative features. The description of computing device 1000 provided herein is provided for purposes of illustration, and is not intended to be limiting. Embodiments may be implemented in further types of computer systems, as would be known to persons skilled in the relevant art(s).

As shown in FIG. 10, computing device 1000 includes one or more processors, referred to as processor circuit 1002, a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing entity based content selection system 108, document analyzer 110, content selection monitor 302, entity determiner 304, document annotator 306, associated entity determiner 308, action system 310, application 312, entity based content selection system 330, DOM analyzer 502, content comparator 504, DOM analyzer 802, content comparator 804, flowchart 200, flowchart 400, and/or flowchart 700 (including any suitable step of flowcharts 200, 400, 700), and/or further embodiments described herein.

A user may enter commands and information into the computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," and "computer-readable storage medium" are used to refer to physical hardware media such as the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media (including memory 920 of FIG. 9). Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of embodiments discussed herein. Accordingly, such computer programs represent controllers of the computing device 1000.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

In one embodiment, a method in a computing device is provided, comprising: detecting a selection mode initiated with regard to a displayed document, the displayed document including content; detecting content selected in the displayed document; determining a plurality of entities in the displayed document, each entity of the plurality of entities including a portion of the content; annotating the displayed document to indicate each of the determined plurality of entities; determining at least one entity of the plurality of entities that is associated with the selected content; indicating in the displayed document the determined at least one entity as one or more active entities; and enabling an action to be performed on the active entities.

In an embodiment, the determining a plurality of entities in the displayed document comprises: analyzing a document object model of the displayed document to determine the plurality of entities.

In an embodiment, the determining at least one entity of the plurality of entities that is associated with the selected content comprises: comparing the selected content to the document object model to determine the at least one entity.

In an embodiment, the determining at least one entity of the plurality of entities that is associated with the selected content comprises: transmitting the displayed document and an indication of the selected content over a network to a document analysis service; and receiving an indication of the at least one entity from the document analysis service over the network.

In an embodiment, the method further comprises: enabling a user to interact with the annotated displayed document to refine the selected content.

In an embodiment, the method further comprises: enabling a user to interact with the annotated displayed document to refine the at least one active entity.

In an embodiment, the annotating comprises: annotating advertisements to be deemphasized in the displayed document.

In an embodiment, the method further comprises: enabling the selection mode to be exited.

In another embodiment, a system in a computer system comprises: a content selection monitor configured to detect a selection mode initiated with regard to a displayed document that includes content, and to detect content selected in the displayed document; an entity determiner configured to determine a plurality of entities in the displayed document, each entity of the plurality of entities including a portion of the content; a document annotator configured to annotate the displayed document to indicate each of the determined plurality of entities; and an associated entity determiner configured to determine at least one entity of the plurality of entities that is associated with the selected content; the document annotator configured to indicate in the displayed document the determined at least one entity as one or more active entities.

In an embodiment, the entity determiner is configured to analyze a document object model of the displayed document to determine the plurality of entities; and the associated entity determiner is configured to compare the selected content to the document object model to determine the at least one entity.

In an embodiment, the associated entity determiner is configured to transmit the displayed document and an indication of the selected content over a network to a document analysis service, and to receive an indication of the at least one entity from the document analysis service over the network.

In an embodiment, the content selection monitor is coupled to a user interface that enables a user to interact with the annotated displayed document to refine the selected content.

In an embodiment, the content selection monitor is coupled to a user interface that enables a user to interact with the annotated displayed document to refine the at least one active entity.

In an embodiment, the document annotator is configured to annotate advertisements to be deemphasized in the displayed document.

In an embodiment, an action system is configured to enable an action to be performed on the active entities.

In still another embodiment, a computer-readable storage medium comprising computer-executable instructions that, when executed by a processor, perform a method comprising: detecting a selection mode initiated with regard to a displayed document, the displayed document including content; detecting content selected in the displayed document; determining a plurality of entities in the displayed document, each entity of the plurality of entities including a portion of the content; annotating the displayed document to indicate each of the determined plurality of entities; determining at least one entity of the plurality of entities that is associated with the selected content; indicating in the displayed document the determined at least one entity as one or more active entities; and enabling an action to be performed on the active entities.

In an embodiment, the determining a plurality of entities in the displayed document comprises: analyzing a document object model of the displayed document to determine the plurality of entities; and said determining at least one entity of the plurality of entities that is associated with the selected content comprises: comparing the selected content to the document object model to determine the at least one entity.

In an embodiment, the determining at least one entity of the plurality of entities that is associated with the selected content comprises: transmitting the displayed document and an indication of the selected content over a network to a document analysis service; and receiving an indication of the at least one entity from the document analysis service over the network.

In an embodiment, the annotating comprises: annotating advertisements to be deemphasized in the displayed document.

In an embodiment, the method further comprises: enabling the selection mode to be exited.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method in a computing device, comprising:
    detecting a selection mode initiated by a user with regard to a displayed document, the displayed document including content;
    automatically, while in the initiated selection mode, detecting content selected in the displayed document by a user;
    automatically determining, in response to the detection of the selection mode initiated by the user, a plurality of entities in the displayed document, each entity of the plurality of entities including a portion of the displayed document content different from the detected selected content;
    automatically annotating the displayed document to indicate each of the determined plurality of entities;
    automatically determining, in response to said determining the plurality of entities in the displayed document, at least one entity of the plurality of entities that includes content of the displayed document content that is associated with the detected selected content;
    automatically indicating in the displayed document the determined at least one entity as one or more active entities; and
    enabling an action to be performed on the active entities.

2. The method of claim 1, wherein said determining a plurality of entities in the displayed document comprises:
    analyzing a document object model of the displayed document to determine the plurality of entities.

3. The method of claim 2, wherein said determining at least one entity of the plurality of entities that is associated with the detected selected content comprises:
comparing the detected selected content to the document object model to determine the at least one entity.

4. The method of claim 1, wherein said determining at least one entity of the plurality of entities that is associated with the detected selected content comprises:
transmitting the displayed document and an indication of the detected selected content over a network to a document analysis service; and
receiving an indication of the at least one entity from the document analysis service over the network.

5. The method of claim 1, further comprising:
enabling a user to interact with the annotated displayed document to refine the detected selected content.

6. The method of claim 1, further comprising:
enabling a user to interact with the annotated displayed document to refine the at least one active entity.

7. The method of claim 1, wherein said annotating comprises:
annotating advertisements to be deemphasized in the displayed document.

8. The method of claim 1, further comprising:
enabling the selection mode to be exited.

9. A system in a computer system, comprising:
a content selection monitor configured to detect a selection mode initiated by a user with regard to a displayed document that includes content, and to automatically detect, while in the initiated selection mode, content selected by a user in the displayed document;
an entity determiner configured to automatically determine, in response to the detection of the selection mode initiated by the user, a plurality of entities in the displayed document, each entity of the plurality of entities including a portion of the displayed document content different from the detected selected content;
a document annotator configured to automatically annotate the displayed document to indicate each of the determined plurality of entities; and
an associated entity determiner configured to automatically determine, in response to said determining the plurality of entities in the displayed document, at least one entity of the plurality of entities that includes content of the displayed document content that is associated with the detected selected content;
the document annotator configured to automatically indicate in the displayed document the determined at least one entity as one or more active entities.

10. The system of claim 9, wherein the entity determiner is configured to analyze a document object model of the displayed document to determine the plurality of entities; and
the associated entity determiner is configured to compare the detected selected content to the document object model to determine the at least one entity.

11. The system of claim 9, wherein the associated entity determiner is configured to transmit the displayed document and an indication of the detected selected content over a network to a document analysis service, and to receive an indication of the at least one entity from the document analysis service over the network.

12. The system of claim 9, wherein the content selection monitor is coupled to a user interface that enables a user to interact with the annotated displayed document to refine the detected selected content.

13. The system of claim 9, wherein the content selection monitor is coupled to a user interface that enables a user to interact with the annotated displayed document to refine the at least one active entity.

14. The system of claim 9, wherein the document annotator is configured to annotate advertisements to be deemphasized in the displayed document.

15. The system of claim 9, wherein an action system is configured to enable an action to be performed on the active entities.

16. A computer-readable storage medium comprising computer-executable instructions that, when executed by a processor, perform a method comprising:
detecting a selection mode initiated by a user with regard to a displayed document, the displayed document including content;
automatically, while in the initiated selection mode, detecting content selected in the displayed document by a user;
automatically determining, in response to the detection of the selection mode initiated by the user, a plurality of entities in the displayed document, each entity of the plurality of entities including a portion of the displayed document content different from the detected selected content;
automatically annotating the displayed document to indicate each of the determined plurality of entities;
automatically determining, in response to said determining the plurality of entities in the displayed document, at least one entity of the plurality of entities that includes content of the displayed document content that is associated with the detected selected content;
automatically indicating in the displayed document the determined at least one entity as one or more active entities; and
enabling an action to be performed on the active entities.

17. The computer-readable storage medium of claim 16, wherein said determining a plurality of entities in the displayed document comprises:
analyzing a document object model of the displayed document to determine the plurality of entities; and
said determining at least one entity of the plurality of entities that is associated with the detected selected content comprises:
comparing the detected selected content to the document object model to determine the at least one entity.

18. The computer-readable storage medium of claim 16, wherein said determining at least one entity of the plurality of entities that is associated with the detected selected content comprises:
transmitting the displayed document and an indication of the detected selected content over a network to a document analysis service; and
receiving an indication of the at least one entity from the document analysis service over the network.

19. The computer-readable storage medium of claim 16, wherein said annotating comprises:
annotating advertisements to be deemphasized in the displayed document.

20. The computer-readable storage medium of claim 16, wherein the method further comprises:
enabling the selection mode to be exited.

* * * * *